(12) United States Patent
Dong et al.

(10) Patent No.: US 6,605,042 B2
(45) Date of Patent: Aug. 12, 2003

(54) METHOD AND APPARATUS FOR ROTATION REGISTRATION OF EXTENDED FIELD OF VIEW ULTRASOUND IMAGES

(75) Inventors: Fang F. Dong, Waukesha, WI (US); Brian Peter Geiser, Hartland, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 176 days.

(21) Appl. No.: 09/682,264

(22) Filed: Aug. 10, 2001

(65) Prior Publication Data
US 2003/0036701 A1 Feb. 20, 2003

(51) Int. Cl.⁷ .................................................. A61B 8/00
(52) U.S. Cl. ....................................................... 600/447
(58) Field of Search ................................. 600/443, 447, 600/448, 449, 444, 432

(56) References Cited
U.S. PATENT DOCUMENTS

| 5,148,810 | A |   | 9/1992  | Maslak et al. |         |
|-----------|---|---|---------|---------------|---------|
| 5,575,286 | A |   | 11/1996 | Weng et al.   |         |
| 5,782,766 | A |   | 7/1998  | Weng et al.   |         |
| 6,014,473 | A | * | 1/2000  | Hossack et al.| 382/294 |
| 6,106,470 | A |   | 8/2000  | Geiser et al. |         |
| 6,117,081 | A | * | 9/2000  | Jago et al.   | 600/443 |
| 6,159,152 | A | * | 12/2000 | Sumanaweera et al. | 600/443 |
| 6,364,835 | B1| * | 4/2002  | Hossack et al.| 600/443 |

* cited by examiner

Primary Examiner—Francis J. Jaworski
Assistant Examiner—Maulin Patel
(74) Attorney, Agent, or Firm—McAndrews, Held & Malloy, Ltd.; Peter J. Vogel; Michael A. Dellapenna

(57) ABSTRACT 1 method is provided for obtaining an extended field of view diagnostic ultrasound image. A first image frame and a second image frame of an object of interest are acquired. The image frames are rotated relative to one another. Pixel points, representing spatial points in the object of interest, are identified in the first image frame. Pixel points corresponding to the pixel points in the first image frame are then computed in the second image frame. A rotation angle between the first and the second image frames is calculated based on a least-squares relation between the pixel points. The first and second image frames are combined to form a part of an extended field of view image.

11 Claims, 4 Drawing Sheets

P

P(x',y')  P(x,y)

METHOD AND APPARATUS FOR ROTATION REGISTRATION OF EXTENDED FIELD OF VIEW ULTRASOUND IMAGES

BACKGROUND OF INVENTION

Certain embodiments of the present invention generally relate to ultrasound imaging for the purpose of medical diagnosis. In particular, certain embodiments of the present invention relate to calculating the rotation angle and the linear shifts between successive ultrasound image frames in order to obtain an extended field of view ultrasound image.

Ultrasound systems are commonly used to produce images of internal anatomy. An ultrasound system may, for example, be used to view the anatomy of a human patient for the purpose of diagnosing disease or determining an appropriate course of medical treatment. The system utilizes an ultrasound probe to acquire an image of the patient's anatomy. The size of the field of view of the acquired image is limited by the aperture size of the probe. Unfortunately, the region of interest within the patient may be larger than the available field of view. In this example, the probe is moved to acquire individual image frames of the region of interest, where such frames were outside the probe's initial field of view. Viewing large regions of interest in this manner, wherein only a portion of the anatomy of interest can be viewed at one time, may be confusing and could potentially limit the ability of the operator to correctly diagnose the patient.

To overcome the size limitation of the available field of view, the imaging technique referred to as "Extended Field of View" (EFOV) may be used. EFOV imaging is useful in various clinical applications including comparisons of adjacent anatomical structures, and in viewing enlarged organs and large abdominal masses.

In EFOV imaging, the probe is moved smoothly and continuously over the desired region of interest. As the probe is moved, the ultrasound system acquires a series of consecutive images. The consecutive images may be adjacent to each other, or the ultrasound system may discard some images and retain other images for processing. For example, one image may be retained for every three images acquired. The retained images are combined by the ultrasound system to form an image of the entire region of interest. The diagnostic value of the EFOV technique largely depends upon the accuracy of the dimensions and relative locations of organ structures in the EFOV image, thus the series of consecutive images must be correctly related to each other. In other words, the images must be adjusted linearly, in one or both of the x and y directions, and rotated as necessary to form an accurate compound image. This process is known as image registration.

The image registration in EFOV imaging computes relative linear shifts between image frames. Because the patient surface is curved in most situations, the image registration method should also accurately estimate the rotational shift (or angle) between a series of successive images. Various registration methods are used in EFOV imaging, including sum of absolute difference (SAD), landmark matching, pattern recognition and analysis, and the like. Among these, the SAD method has been found to be more effective and less computationally intensive than the other registration methods.

Previously, the SAD method has been used to compute both the linear shifts and the rotation angle between consecutive image frames in a series. To compute the linear shifts, the SAD method divides two consecutive image frames into kernels, and then compares the pixel values of the kernels of one image frame to the pixel values of the corresponding kernels of the other image frame. The kernels of one image are moved within a defined boundary to find the location within the boundary that is the most similar to the corresponding kernel of the other image. In a similar manner, to compute the rotation angle, the SAD method rotates one image frame through a predetermined range of degrees at a preset step size. Each time the image frame is rotated, the pixel values are compared to the pixel values of the second image frame. The angle at which the two image frames are the most similar is determined to be the angle of rotation between the two image frames.

Although the SAD method is effective in computing linear shifts, it is very time consuming when used to compute the rotation angle. In addition, the SAD method utilizes a preset discrete step size when rotating one image frame in relation to the other image frame. To reduce computation time, the step size may be set somewhat course. Unfortunately, it is possible that the most accurate rotation angle is an angle that occurs between two preset steps. Decreasing the preset step size, however, would further increase the time required to compute the rotation angle, and is thus not desirable. Because EFOV images may typically cover large angles, such as 90 degrees, and may be comprised of up to 1000 individual image frames, any increase in computation time is not desirable. Thus, a need has long existed in the industry for a method for calculating rotation and linear image registration in EFOV imaging that addresses the problems noted above and other problems that will become apparent from the following description.

SUMMARY OF INVENTION

In accordance with at least one embodiment, a method is provided for obtaining an extended field of view diagnostic ultrasound image. First and second image frames of an object of interest are acquired. The image frames are rotated relative to one another. Pixel points, representing spatial points in the object of interest, are identified in the first image frame. Pixel points corresponding to the pixel points in the first image frame are then computed in the second image frame. A rotation angle between the first and the second image frames is calculated based on a least-squares relation between the pixel points. The first and second image frames are combined to form an extended field of view image.

In accordance with at least one embodiment, multiple registration kernels are identified in the first and second image frames, and a search region containing a kernel is identified in the second image frame. The pixel points are identified by a set of coordinates. In one embodiment, the rotation angle is calculated using the coordinates of the pixel points and a number representing the number of registration kernels in each of the image frames. In an alternative embodiment, the image frames are acquired successively in time.

In accordance with at least one embodiment, the image frames are linearly shifted relative to one another. The linear shift is calculated based on a sum of absolute differences between the pixel points in the image frames. In an alternative embodiment, the linear shift is calculated based on a least-squares method.

In accordance with at least one embodiment, a method is provided for computing the image registration of two images. Consecutive image frames are acquired. The image frames represent partially overlapping portions of a region of interest. At least one pixel point in each image frame representing one spatial point in the region of interest is identified. In an alternative embodiment, the pixel points of the second image frame are computed based on a sum of absolute differences. The squared difference between the pixel points in consecutive image frames is calculated to obtain a rotation angle between consecutive image frames. In an alternative embodiment, the squared difference comprises a least-squares relation between the pixel points. In another embodiment, the rotation angle is derived from a continuous range of possible rotation angles.

In accordance with at least one embodiment, multiple registration kernels are identified in each image frame. The squared difference is calculated by using a value representing the number of registration kernels located in each image frame and the pixel coordinates. In an alternative embodiment, the first and second coordinates are summed over a predetermined range to calculate the squared difference.

In accordance with at least one embodiment, a linear shift between the consecutive image frames is calculated based on the pixel points. In an alternative embodiment, the linear shift is calculated based on a least-squares relation utilizing the rotation angle and the pixel points of the consecutive image frames.

The foregoing summary, as well as the following detailed description of the embodiments of the present invention, will be better understood when read in conjunction with the appended drawings. It should be understood, however, that the present invention is not limited to the arrangements and instrumentality shown in the attached drawings.

DETAILED DESCRIPTION

Figure 1:
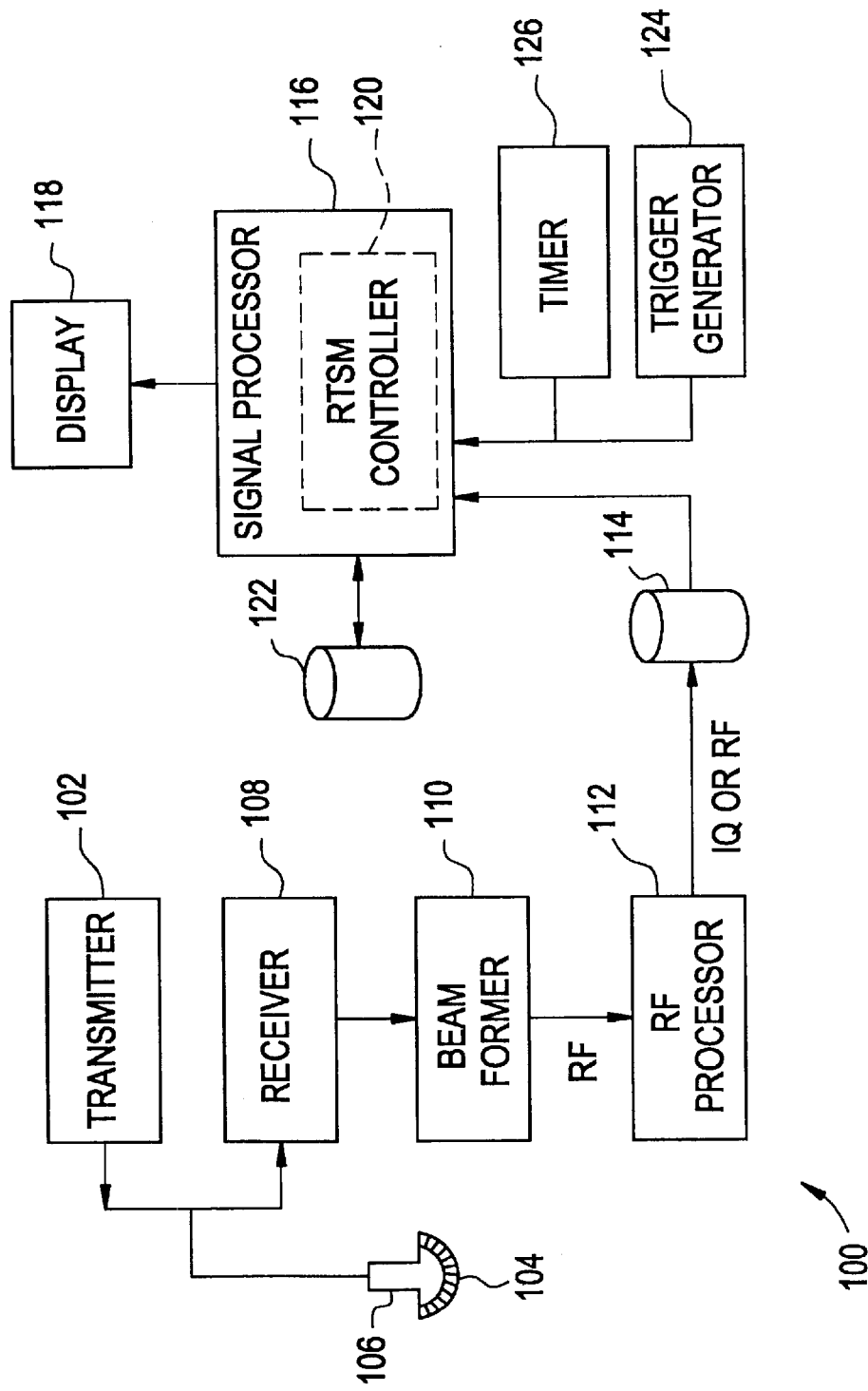
FIG. 1 illustrates a block diagram of an ultrasound system formed in accordance with an embodiment of the present invention.

FIG. 1 illustrates a block diagram of an ultrasound system 100 formed in accordance with an embodiment of the present invention. The ultrasound system 100 includes a transmitter 102 which drives transducers 104 within a probe 106 to emit pulsed ultrasonic signals into a body. The ultrasonic signals are backscattered from structures in the body, like blood cells or muscular tissue, to produce echoes which return to the transducers 104. The echoes are detected by a receiver 108. The received echoes are passed through a beamformer 110, which performs beamforming and outputs an RF signal. The RF signal then passes through an RF processor 112. The RF signal data may then be routed directly to a buffer 114 for temporary storage. Alternatively, the RF processor 112 may include a complex demodulator (not shown) that demodulates the RF signal to form IQ data pairs representative of the echo signals prior to temporary storage in buffer 114.

The ultrasound system 100 also includes a signal processor 116 to process the acquired ultrasound information (i.e., RF signal data or IQ data pairs) and prepare frames of ultrasound information for display on display 118. The signal processor 116 is adapted to perform one or more processing operations according to a plurality of selectable ultrasound modalities on the acquired ultrasound information. Acquired ultrasound information may be processed in real-time during a scanning session as the echo signals are received. Additionally or alternatively, the ultrasound information may be stored temporarily in buffer 114 during a scanning session and processed in less than real-time in a live or off-line operation.

The ultrasound system 100 often continuously acquires ultrasound information at a frame rate that exceeds 50 frames per second—the approximate perception rate of the human eye. The acquired ultrasound information is displayed on display 118 at a slower frame-rate. The signal processor 116 includes a real-time slow motion controller (RTSM controller) 120 that controls which frames of acquired ultrasound information are to be displayed and the frame rate of the display or display rate. A memory 122 is included for storing processed frames of acquired ultrasound information that are not scheduled to be displayed immediately. The RTSM controller 120 controls which frames are retrieved for display. Preferably, the memory 122 is of sufficient capacity to store at least several seconds worth of frames of ultrasound information. The frames of ultrasound information are stored in a manner to facilitate retrieval thereof according to an order or time of acquisition. The memory 122 may comprise any known data storage medium. When the acquired ultrasound information is to be processed in less than real-time, the RTSM controller 120 may also control what ultrasound information is retrieved from buffer 114 for processing.

In order to allow the real-time slow motion display to catch up with the live acquisition that is ongoing and acquiring data at a higher frame-rate than the data is displayed, the RTSM processor 120 periodically synchronizes the display 118 with the ongoing acquisition. Without synchronization, the display 118, which is presenting ultrasound information at a display rate with a slower frame-rate than the acquisition rate, would lag longer and longer behind the acquisition and the live feedback during slow motion display would be lost. Synchronization between acquisition and display may be accomplished in a triggered or non-triggered manner. Accordingly, ultrasound system 100 may include a trigger generator 124 and/or a timer 126 which sends a synchronization signal to RTSM controller 120.

Figure 2:
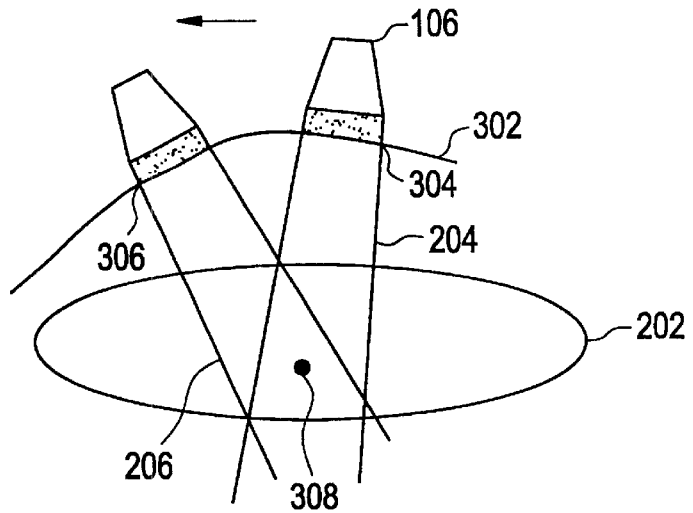
FIG. 2 illustrates two ultrasonic beams used to acquire image frames of a region of interest obtained in accordance with an embodiment of the present invention.

FIG. 2 illustrates two ultrasonic beams used to acquire image frames of a region of interest (ROI). Each ultrasonic beam is comprised of pulsed ultrasonic signals. FIG. 2 includes a probe 106 and a patient surface 302. When the probe 106 is at position one 304, the ultrasound system 100 transmits and receives the echoes in an ultrasonic beam 204. At position two 306, the ultrasound system 100 transmits and receives the echoes in an ultrasonic beam 206.

The ultrasonic beams 204 and 206 are directed at a portion of a ROI 202. For example, the ROI 202 may be a patient's liver or other anatomy too large to be viewed in a single image frame. The ultrasound system 100 acquires a first image frame at position one 304 and a second image frame at position two 306. The image frames include a common point (P) 308. The two image frames may be pasted together to create an extended field of view (EFOV) image. By creating an EFOV image, anatomy that is larger than the width of a single image frame may be viewed at one time as a single image on the display 118.

For example, in order to create an EFOV image of the ROI 202, multiple, successive image frames are pasted together. It is possible that the successive image frames may not be adjacent. Each pair of successive image frames that are pasted together include at least one common point (P) 308. The second image frame, however, may be rotated and shifted linearly compared to the first image frame. In order to paste the two image frames together, there is a need to perform the image registration, or compute the relative positioning, between the two images.

Figure 3:
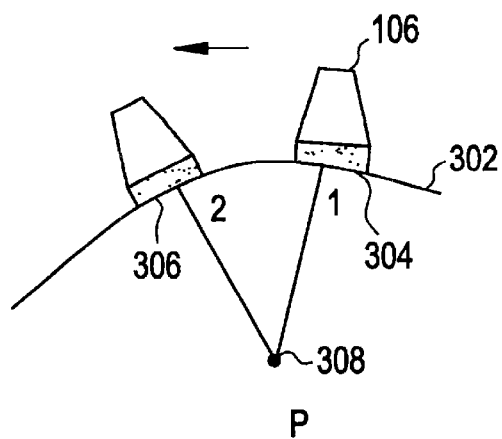
FIG. 3 illustrates the probe positioning utilized to acquire successive image frames that are used to create an extended field of view image obtained in accordance with an embodiment of the present invention.

FIG. 3 illustrates the probe 106 positioning utilized to acquire successive image frames that are used to create an extended field of view (EFOV) image. FIG. 3 includes a probe 106, a patient surface 302, a position one 304, a position two 306, and a common pixel point (P) 308. The common pixel point (P) 308 is included in the image frame acquired at position one 304 and the image frame acquired at position two 306, as previously discussed. The method utilized to acquire images at positions one 304 and two 306 is further discussed below.

Figure 4:
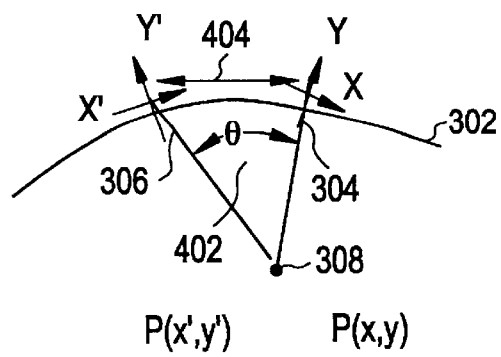
FIG. 4 illustrates the coordinate systems of two successive image frames utilized to compute an extended field of view image obtained in accordance with an embodiment of the present invention.

FIG. 4 illustrates the coordinate systems of two successive image frames utilized to compute a EFOV image. On the patient surface 302, position one 304 has a coordinate system (x-y), and position two 306 has a coordinate system (x'-y'). In coordinate system (x-y), the common pixel point (P) 308 has a coordinate of P(x,y). In coordinate system (x'-y'), the common pixel point (P) 308 has a coordinate P(x',y').

The origin of each coordinate system (x-y) and (x'-y') is the rotation center of the probe 106. For most linear and phased-array probes, the origin is approximately at the center of the probe's surface. The coordinate system (x'-y') may be rotated and linearly translated compared to the coordinate system (x-y). For example, the coordinates in coordinate system (x-y) can be transformed into coordinate system (x'-y') by introducing a rotation angle θ 402 and an image frame linear shift (a,b) 404. In FIG. 4, the image frame linear shift (a,b) 404 is the distance from position one 304 to position two 306, in an (x,y) direction, on the patient surface 302. When calculating an EFOV image, the rotation angle θ 402 between two consecutive image frames is typically 10 degrees or less. Thus, the rotation angle θ 402 may be separated from the image frame linear shift (a,b) 404, and the coordinate system (x-y) may be related to the coordinate system (x'-y') by the following matrix operation:

$$\begin{pmatrix} x' \\ y' \end{pmatrix} = \begin{pmatrix} \cos\theta & \sin\theta \\ -\sin\theta & \cos\theta \end{pmatrix} \begin{pmatrix} x \\ y \end{pmatrix} - \begin{pmatrix} a \\ b \end{pmatrix} \qquad \text{Equation 1}$$

wherein x and y are the coordinates of the common pixel P(x,y) of the first image frame, x' and y' are the coordinates of the common pixel P(x',y') of the second image frame, θ is the rotation angle θ 402, and a and b define the image frame linear shift (a,b) 404 from position one 304 to position two 306.

The image frame acquired at position one 304 and the image frame acquired at position two 306 are divided into multiple registration kernels. Each registration kernel of the position one 304 image frame is centered at location $P_i$, and $i=1, \ldots, N$. N may be any number, but N is limited by the computational power of the signal processor 116. $P_i$ is the same spatial point for two consecutive image frames. A Sum of Absolute Difference (SAD) method compares the registration kernels of the image frame acquired at position one 304 to the registration kernels of the image frame acquired at position two 306 to determine the location of the common pixel point $P_i$ for each kernel of the image frame acquired at position two 306. For example, the coordinates for $P_i$ in coordinate system (x-y) at position one 304 are $(x_i, y_i)$. When the probe is moved to position two 306, the coordinates for the same spatial pixel point $P_i$ in the coordinate system (x'-y') are $(x'_i, y'_i)$.

Once the coordinates $(x'_i, y'_i)$ for $P_i$ are known for each registration kernel, the rotation angle θ 402 and the linear shift (a,b) 404 may be estimated using a least-squares method. If the estimated rotation angle is $\theta_e$, and the estimated linear shift for the coordinate system (x'-y') is $(a_e, b_e)$, by substituting the estimated values into Equation 1, the estimated coordinates for $P_i$ in (x'-y') may be written as:

$$\begin{pmatrix} x_i^e \\ y_i^e \end{pmatrix} = \begin{pmatrix} \cos\theta_e & \sin\theta_e \\ -\sin\theta_e & \cos\theta_e \end{pmatrix} \begin{pmatrix} x_i \\ y_i \end{pmatrix} - \begin{pmatrix} a_e \\ b_e \end{pmatrix} \qquad \text{Equation 2}$$

$$i = 1, \ldots, N$$

wherein the estimated rotation angle is $\theta_e$, the estimated coordinates of $P_i$ are $x^e_i$ and $y^e_i$, and the estimated linear shifts from the coordinate system (x'-y') are $a_e$ and $b_e$.

In Equation 2, the estimated coordinates for $P_i$ in coordinate system (x'-y') are $(x^e_i, y^e_i)$. Utilizing the least-squares optimization principle, the squared difference between the estimated coordinates $(x^e_i, y^e_i)$ and the coordinates $(x'_i, y'_i)$ computed utilizing the SAD method for the same spatial point $P_i$ may be calculated using Equation 3:

$$\Delta = \sum_i (x_i^e - x_i')^2 + \sum_i (y_i^e - y_i')^2 \qquad \text{Equation 3}$$

$$i = 1, \ldots, N.$$

It is desirable for the squared difference Δ to be a minimum value or zero. If the value of the squared difference Δ is zero, then the estimated coordinates $(x^e_i, y^e_i)$ for $P_i$ are the true coordinates of $P_i$. Substituting from Equation 2, the estimated coordinates $(x^e_i, y^e_i)$ are replaced in Equation 3:

$$\Delta = \sum_i (x_i\cos\theta_e + y_i\sin\theta_e - a_e - x_i')^2 + \qquad \text{Equation 4}$$

$$\sum_i (-x_i\sin\theta + y_i\cos\theta - b_e - y_i')^2$$

$$i = 1, \ldots, N.$$

Equations 5, 6, and 7 are derived from Equation 4 by taking the derivative of the squared difference Δ vs. the estimated angle $\theta_e$ and the estimated linear shifts $a_e$ and $b_e$ for the coordinate system (x'-y'):

$$\frac{\partial \Delta}{\partial a_e} = \sum_i (2a_e - 2y_i\sin\theta_e - 2x_i\cos\theta_e + 2x_i') = 0 \qquad \text{Equation 5}$$

-continued $$\frac{\partial \Delta}{\partial b_e} = \sum_i (2b_e - 2x_i \sin\theta_e - 2y_i \cos\theta_e + 2y'_i) = 0 \quad \text{Equation 6}$$

$$\frac{\partial \Delta}{\partial \theta_e} = \sum_i (2(x_i y'_i - x'_i y_i)\cos\theta_e + 2(x'_i x_i + y_i y'_i)\sin\theta_e + \quad \text{Equation 7}$$

$$2(x_i b_e - y_i a_e)\cos\theta_e + 2(x_i a_e - y_i b_e)\sin\theta_e) = 0$$

$$i = 1, \ldots, N.$$

As stated previously, it is desirable for the squared difference Δ to be zero. Therefore, Equations 5, 6, and 7 are each set equal to zero.

Using the coordinate values $(x_i, y_i)$ and $(x'_i, y'_i)$ of $P_i$ for each registration kernel, the estimated rotation angle $\theta_e$ is calculated using Equation 8:

$$\tan\theta_e = \frac{\sum_i (x_i y'_i - x'_i y_i) + \frac{1}{N}\left[\sum_i x'_i \cdot \sum_i y_i - \sum_i x_i \sum_i y'_i\right]}{\frac{1}{N}\left[\sum_i x'_i \cdot \sum_i x_i + \sum_i y_i \sum_i y'_i\right] - \sum_i (x_i x'_i + y_i y'_i)} \quad \text{Equation 8}$$

$$i = 1, \ldots, N,$$

wherein the coordinates $(x_i, y_i)$ are the coordinates of $P_i$ when the probe 106 is at position one 304, the coordinates $(x'_i, y'_i)$ are the coordinates of $P_i$ when the probe 106 is at position two 306, and N is the number of registration kernels. As stated previously, coordinates $(x'_i, y'_i)$ are calculated using the SAD method.

Figure 5:
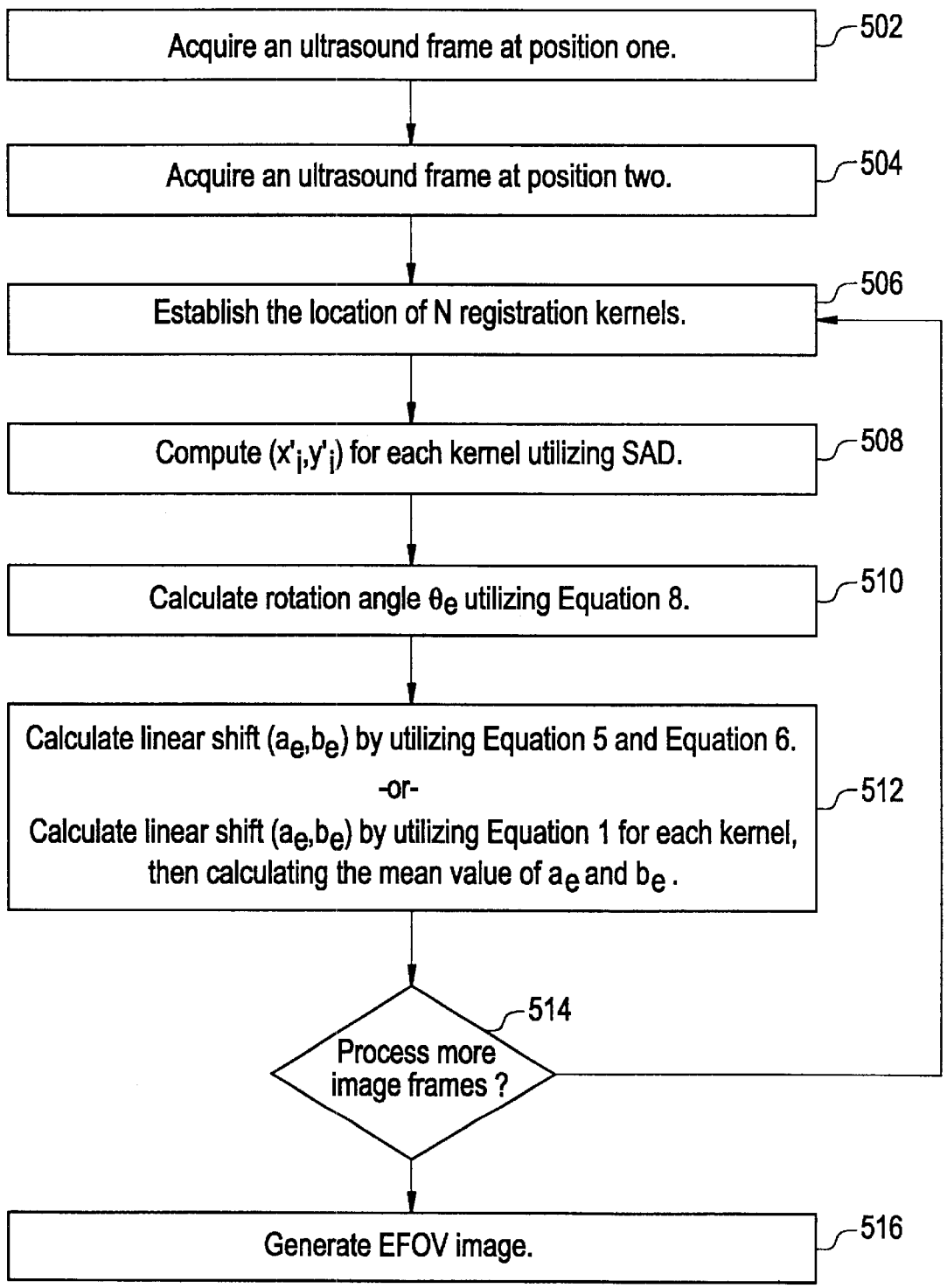
FIG. 5 illustrates a flowchart of a method utilized to acquire an extended field of view image obtained in accordance with an embodiment of the present invention.

FIG. 5 illustrates a flowchart of a method utilized to acquire an EFOV image. At step 502 of FIG. 5, an operator positions the probe 106 on the patient surface 302 at a first position 304 to image the ROI 202 as illustrated in FIG. 2. The transmitter 102 drives the transducers 104 within the probe 106 to transmit the ultrasonic beam 204. The receiver 108 detects the echoes which are produced by various structures within the patient's body. The ultrasound system 100 processes the echoes as previously discussed and stores a first image frame 602 (FIG. 6) that includes a common pixel point (P) 308 in the buffer 114.

At step 504 of FIG. 5, the operator moves the probe 106 across the patient surface 302 to a second position 306. As stated previously, the rotation angle θ 402 between first and second positions 304 and 306 is 10 degrees or less in normal scanning. The ultrasound system 100 continues to acquire image frames between the first and second positions 304 and 306. The image frames acquired between the first and second positions 304 and 306, however, are not required to produce an EFOV image and may be discarded. The ultrasound system 100 stores, in the buffer 114, a second image frame 604 (FIG. 6) acquired at the second position 306 that includes the common pixel point (P) 308.

At step 506, the signal processor 116 establishes the locations of N registration kernels that will be used to process the first and second image frames 602 and 604 acquired at the first and second positions 304 and 306 respectively. As previously discussed, N may be any number. For example, N may be 8 as illustrated in FIG. 6.

Figure 6:
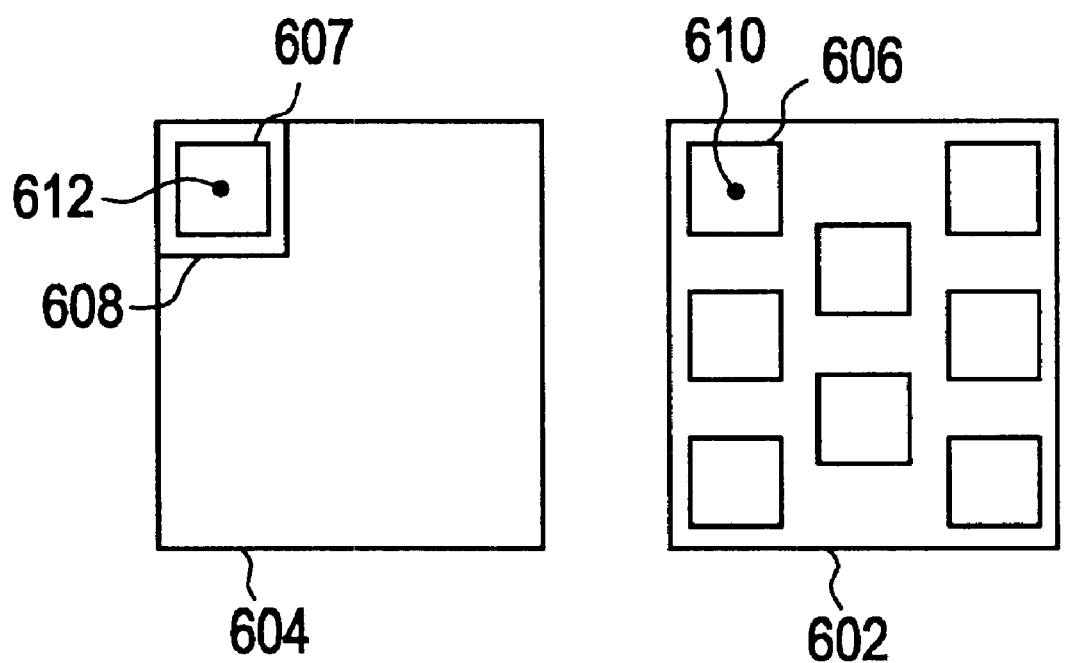
FIG. 6 illustrates two image frames to be processed by the Sum of Absolute Difference method in accordance with an embodiment of the present invention.

FIG. 6 illustrates the first and second image frames 602 and 604 to be processed by the SAD method. The first image frame 602 is divided into eight kernels 606. The second image frame 604 is divided into eight kernels 607, although only one kernel 607 is illustrated. Each kernel 606 and 607 is the same size and shape, and may be 40 pixels by 40 pixels in size, for example. A search region 608 is also illustrated. The kernels 606 and 607 and the search region 608 may be any size and shape determined to effectively process the first and second image frames 602 and 604 utilizing the SAD method. Pixel point $(P_i)$ 610 is included in the first image frame 602, and pixel point $(P_i)$ 612 is included in the second image frame 604. Pixel points $(P_i)$ 610 and 612 represent the same spatial pixel point, as illustrated in FIG. 4.

At step 508 of FIG. 5, the signal processor 116 computes the coordinates $(x'_i, y'_i)$ for pixel point $(P_i)$ 612 using the SAD method. The coordinates $(x'_i, y'_i)$ are computed for each pixel point $(P_i)$ 612 in each N kernel 607, wherein i=1 . . . , N. Continuing with the above example, there are 8 kernels in the first and second image frames 602 and 604, thus 8 coordinates of $P_i(x'_i, y'_i)$ are computed. The coordinates $P_i(x'_i, y'_i)$ are utilized in Equation 8 as illustrated below.

Using the SAD method, the processor reads each pixel value of the first kernels 606 and 607 (i.e. N=1), subtracts the value of one corresponding pixel from the other, and takes the absolute value of the result. For example, if the pixel value of pixel location (1,1) of kernel 606 (N=1) is 10, and the pixel value of pixel location (1,1) of kernel 607 (N=1) is 5, 5 is subtracted from 10. The absolute value of the difference is 5. The process is repeated for pixel location (1,2), and for every other pixel location of kernels 606 and 607 wherein N=1. The absolute value results for each pixel location are added together to comprise the sum of absolute differences. The kernel 607 (N=1) is moved within the search region 608, and the aforementioned method is repeated to find the location of kernel 607 with the search region 608 that produces the minimum sum of absolute differences. The signal processor 116 may utilize a step size to move the kernel 607 within the search region 608, rather than move the kernel 607 one pixel at a time. Once the location of the kernel 607 that produces the minimum SAD value has been identified, the coordinates $(x'_i, y'_i)$ of $P_i$ are identified as the center of kernel 607 (N=1). The aforementioned process is repeated for each kernel 606 and 607.

At step 510, the rotation angle $\theta_e$ is calculated utilizing Equation 8. Equation 8 uses the coordinates $P_i(x_i, y_i)$ of each kernel 606 of the first image frame 602, and the coordinates $P_i(x'_i, y'_i)$ of each kernel 607 of the second image frame 604 that were computed using the SAD method at step 508.

At step 512, the linear shifts $a_e$ and $b_e$ are calculated. The linear shifts $a_e$ and $b_e$ may be calculated using Equation 5 and Equation 6. Equation 5 uses the value of the rotation angle $\theta_e$ calculated in Equation 8 and the coordinates $(x_i, y_i)$ and $(x'_i, y'_i)$ to calculate the value of $a_e$. Equation 6 uses the value of the rotation angle $\theta_e$ calculated in Equation 8 and the coordinates $(x_i, y_i)$ and $(x'_i, y'_i)$ to calculate the value of $b_e$. Alternatively, Equation 1 may be utilized to calculate the linear shifts $a_e$ and $b_e$. In Equation 1, the linear shifts for $a_e$ and $b_e$ are first calculated for each $P_i$. Then the mean values of $a_e$ and $b_e$ are calculated.

At step 514, the signal processor 116 determines whether there are more image frames to process. Although FIG. 6 illustrates only two ultrasound frames, it should be understood that an EFOV image is often comprised of many ultrasound image frames. For example, in order to display a ROI 202 of patient anatomy that is 6 cm in length, up to 1000 individual image frames may be acquired. Thus, as the probe 106 is moved along the patient surface 302, the ultrasound system 100 acquires and stores many image frames to be processed by the method illustrated in FIG. 5.

If the answer at step 514 is Yes, control passes to step 506. The locations of N kernels 607 are established for the next consecutive image frame, and the value of N is the same value of N utilized by image frames 602 and 604. The method continues to process the image frame, and all subsequent image frames, as described above. Each image frame may be processed in the order in which it was acquired, or in another order determined by the signal processor 116. Each image frame is, however, processed in relation to the preceding image frame which is retained for building the EFOV image.

If the answer at step 514 is No, control passes to step 516. At step 516, the signal processor 116 utilizes the calculated rotation angle $\theta_e$ and linear shift $(a_e,b_e)$ to paste the image frames together, building the EFOV image. The calculated rotation angle $\theta_e$ is the rotation angle $\theta$ 402, and the linear shift $(a_e,b_e)$ is the linear shift $(a,b)$ 404. The EFOV image may be displayed on the display 118 or held in memory 122 to be displayed, printed, further processed, and the like.

Previously, the SAD technique was also utilized to calculate the rotation angle $\theta$ 402 between two image frames. It is evident that the SAD technique, illustrated in relation to steps 506 and 508 of FIG. 5, requires many computational steps to calculate the difference between two image frames. By utilizing Equation 8 to calculate the rotation angle instead of using the aforementioned SAD technique, computation time is considerably reduced. Additionally, because Equation 8 is solely based on relative position and does not utilize a preset step size, such as the preset step size utilized by the SAD technique, the rotation angle $\theta_e$ 402 calculated using Equation 8 may be more accurate than the rotation angle $\theta$ 402 calculated using the SAD technique.

While the invention has been described with reference to at least one embodiment, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for computing the image registration of two images, the method comprising:
   acquiring consecutive image frames of an object of interest, said consecutive image frames representing at least partially overlapping portions of a region of interest;
   identifying at least one pixel point in each image frame representing one spatial point in the region of interest;
   calculating a squared difference between pixel points in said consecutive image frames to obtain a rotation angle between said consecutive image frames; and
   calculating a linear shift between said consecutive image frames based on said pixel points.

2. The method of claim 1, said calculating a squared difference step further comprises a least-squares relation between said pixel points in each image frame.

3. The method of claim 1, further comprising:
   identifying multiple registration kernels in each said image frame.

4. The method of claim 1, said squared difference calculating step further comprising:
   deriving the rotation angle from a continuous range of possible rotation angles.

5. The method of claim 1, said identifying step further comprising:
   computing said pixel points of a second image frame based on a sum of absolute differences.

6. The method of claim 1, wherein each of said pixel points is identified by a set of coordinates.

7. The method of claim 1, further comprising calculating a linear shift between consecutive image frames based on a least-squares method.

8. The method of claim 1, said squared difference calculating step further comprising:
   identifying a value representative of a quantity of multiple registration kernels located in each said image frame;
   identifying said pixel points by coordinates; and
   computing said rotation angle utilizing said value and said coordinates.

9. The method of claim 1, the calculating a squared difference step further comprising:
   identifying each of said pixel points by a first and second coordinate; and
   summing said first and second coordinates over a predetermined range.

10. A method for computing the image registration of two images, the method comprising:
    acquiring consecutive image frames of an object of interest, said consecutive image frames representing at least partially overlapping portions of a region of interest;
    identifying at least one pixel point in each image frame representing one spatial point in the region of interest;
    calculating a squared difference between pixel points in said consecutive image frames utilizing a least-squares relation to obtain a rotation angle between said consecutive image frames; and
    calculating a linear shift between said consecutive image frames based on said pixel points.

11. A method for computing the image registration of two images, the method comprising:
    acquiring consecutive image frames of an object of interest, said consecutive image frames representing at least partially overlapping portions of a region of interest;
    identifying at least one pixel point in each image frame representing one spatial point in the region of interest;
    calculating a squared difference between pixel points in said consecutive image frames utilizing a least-squares relation to obtain a rotation angle derived from a continuous range of possible rotation angles between said consecutive image frames; and
    calculating a linear shift between said consecutive image frames based on said pixel points.

* * * * *